UNITED STATES PATENT OFFICE.

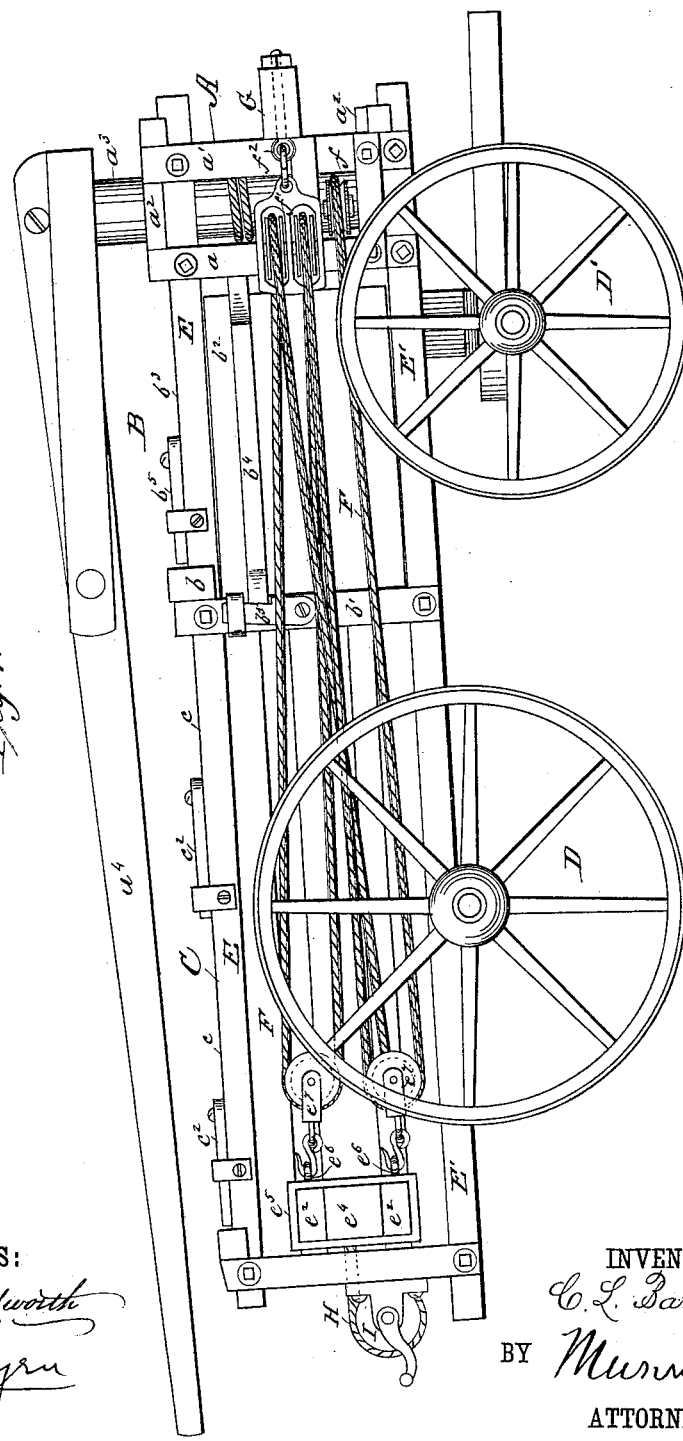

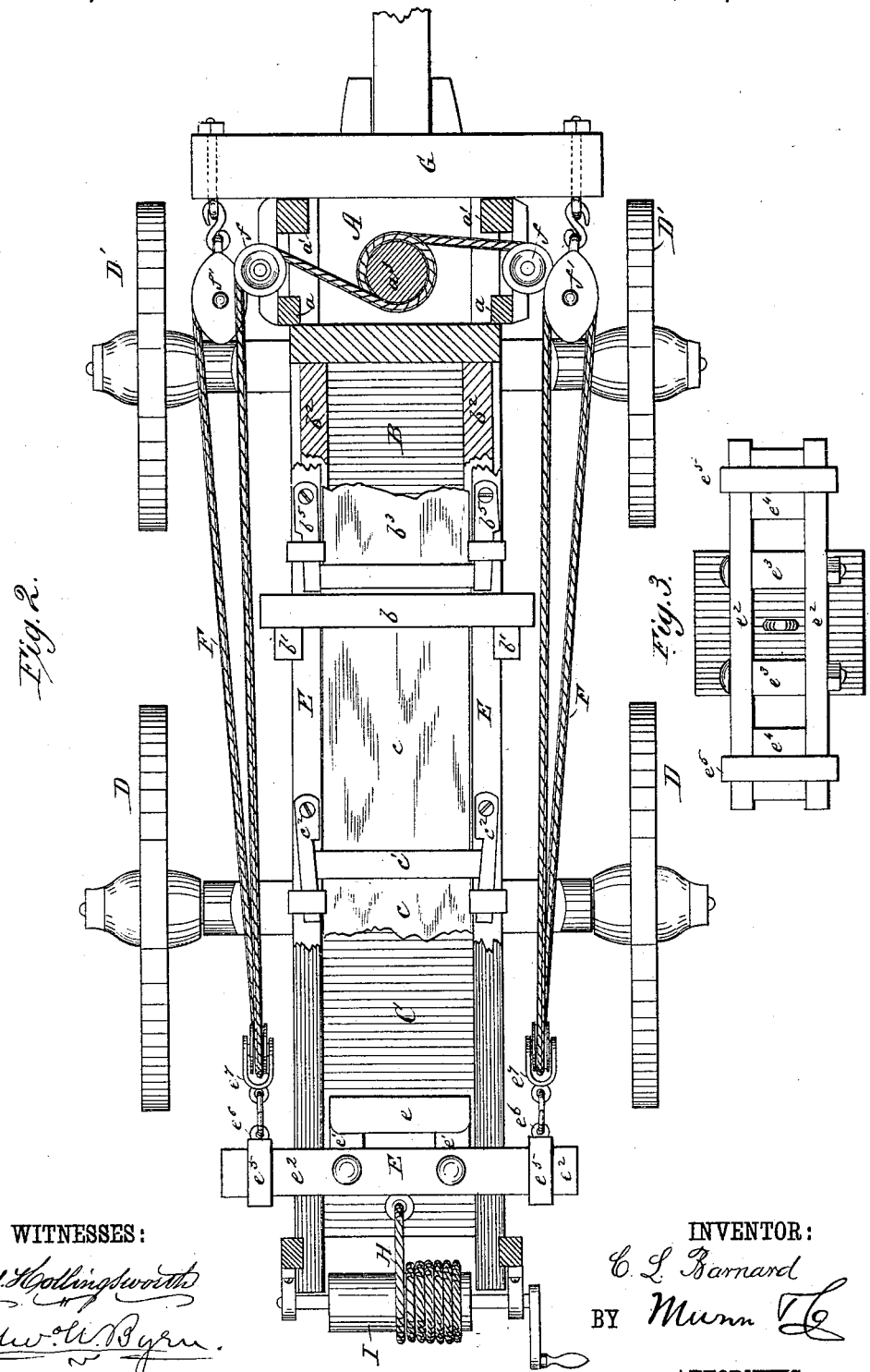

CHARLES LYNCH BARNARD, OF BYHALIA, MISSISSIPPI.

PORTABLE HAY AND COTTON PRESS.

SPECIFICATION forming part of Letters Patent No. 332,037, dated December 8, 1885.

Application filed August 27, 1885. Serial No. 175,501. (No model.)

*To all whom it may concern:*

Be it known that I, CHARLES LYNCH BARNARD, a citizen of the United States, residing at Byhalia, in the county of Marshall and State of Mississippi, have invented a new and useful Improvement in Portable Hay and Cotton Presses, of which the following is a description.

Figure 1 is a side elevation. Fig. 2 is a plan view, partly broken away; and Fig. 3 is a rear detail view of the follower.

The object of my invention is to provide a simple, inexpensive, and strong press for baling hay or cotton, which may be transported from place to place on wheels, and which in baling hay may be run into the field and the hay baled as it is gathered up from the ground.

It consists in the peculiar construction and arrangement of parts, which I will now proceed to describe.

In the drawings, A B C represent the body of the press, whose length is disposed horizontally, and is supported upon wheels D D' for easy transportation. The front part, A, of the press carries a windlass mechanism for operating the platen. The middle part, B, is the press-box proper, in which the bale is compressed, and the rear part, C, which is the longest, constitutes a space into which the hay or cotton is placed, and in which the follower reciprocates in forcing the hay into the press-box.

E E E' E' are four horizontal corner-beams, which extend throughout the full length of the three sections of the press, and to which all the other parts of the press are fastened. At the front of the bars E E' there are two vertical bars, $a$ and $a'$, on each side, and connecting the two bars E E at the top and E' E' at the bottom are two wide horizontal bars or plates, $a^2$, in which is arranged to revolve a vertical windlass, $a^3$, having a long arm, $a^4$, which sweeps around the entire press, and by which the windlass is wound up. The middle part, B, of the press is divided off from the rear part, C, by horizontal cross-bar $b$ and vertical cross-bar $b'$, and between these bars and the front part, A, of the press are arranged side doors, $b^2$, and a top door, $b^3$, secured in place by cross-bars $b^4$ and latch-bars $b^5$, so that these doors may be removed to facilitate the placing of bands around the bale after it is compressed. The rear part, C, of the press has detachable doors $c$, with fastening-bars $c'$ and latch-bars $c^2$, which are removed when the hay or cotton is deposited in this portion, and are put on again when the hay is forced into the press-box by the follower. The sides of the part C of the press are made of parallel bars with spaces between them, which permit an extension from the follower to pass through to connect with the tackle for drawing the follower into the press-box.

E is the follower, which consists of the front plate or board, $e$, corner-supports $e'$, and a rectangular frame, $e^2$ $e^2$ $e^3$ $e^3$, behind it, of which latter frame the two horizontal bars $e^2$ $e^2$ pass through the slots or open spaces in the sides of the part C, and serve both to guide the follower in its movement and serve as points of attachment for the gear or tackle that connects with the windlass. Between the two ends $e^2$ $e^2$ of the follower a filling-block, $e^4$, is placed, and around them a square band, $e^5$, of metal is arranged on which are formed eyes $e^6$ $e^6$, to which pulleys or sheaves $e^7$ are hooked. Through these pulleys pass ropes F on each side of the follower, which ropes pass around a horizontal pulley, $f$, at the front and connect with the windlass, and also pass around a double-sheaved block, $f'$, on each side, whose hook is fastened into an eye of an eyebolt, $f^2$, on the ends of a bar, G, which is fastened horizontally across the front end of the press. Now by turning the windlass by means of its lever it will be seen that the rope is equally wound upon both sides and the follower drawn to the front, compressing the hay in the rear part, C, and forcing it into the press-box B. For drawing the follower back after the bale is formed, a rope, H, is attached to the rear side of the same, and is wound upon a windlass, I, at the rear end of the press.

In making use of my invention I may in some instances, as in baling cotton, dispense with the wheels and mount the press upon a suitable stationary platform.

In defining my invention with greater clearness I would state that I am aware that it is not new to construct a baling-press with a baling-chamber and feed-chamber, and to mount them on wheels and combine them with cords passing around pulleys on the arms of the follower, and passing around pulleys and attached to a windlass in front, which windlass is operated by a sweep; and I do not claim this, broadly. My improvement consists in arranging the windlass between the two sections of cord that come from the two ends of the follower and connecting said windlass to said cords, so that when the windlass is turned it winds up the sections of cord on its opposite sides, running to both ends of the follower, thus causing the strain or pull of the cord on one side of the windlass to neutralize the pull of the cord on the other side, so as to relieve the bearings of the windlass of the great strain and friction on one side and holding it balanced. By combining the windlass and cord as thus arranged also with the double set of pulley-blocks at front and rear I get a greatly-increased power for the operation of the platen, with little or no increase in the complication of the mechanism, and am also enabled to exert the power to a much greater advantage.

Having thus described my invention, what I claim as new is—

1. A cotton or hay press consisting of a front frame, A, having a vertical windlass provided with an arm or sweep, a middle portion, B, forming the press-box and provided with detachable doors, and the rear part, C, also provided with detachable doors at the top, and having slots or open spaces at its sides, and a follower arranged within the section C, and having extensions protruding through the slots in the sides, and ropes and pulleys connecting the follower to the windlass, the said ropes from the opposite ends of the follower being led up to the windlass upon opposite sides of the same, to permit them to be simultaneously wound and their strain on the bearings neutralized, substantially as shown and described.

2. The combination of the press-body A B C, having a vertical windlass in its front end, A, and a follower in its rear end, C, the said follower having extensions protruding through the sides of the press, the pulleys $e'$, pulley-block $f'$, cross-beam G, pulleys $f f$, and cord F, passing around said pulleys and attached to the windlass, the sections of cord F being led to the windlass from opposite sides and attached to the same for simultaneous winding, substantially as and for the purpose described.

CHARLES LYNCH BARNARD.

Witnesses:
THO. M. KEMP,
W. C. McCRARY.